United States Patent
Ahn et al.

(10) Patent No.: US 11,431,025 B2
(45) Date of Patent: Aug. 30, 2022

(54) COMPOSITION FOR GEL POLYMER ELECTROLYTE, GEL POLYMER ELECTROLYTE PREPARED THEREFROM, AND ELECTROCHEMICAL DEVICE INCLUDING THE SAME

(71) Applicant: LG Chem, Ltd., Seoul (KR)

(72) Inventors: Kyoung Ho Ahn, Daejeon (KR); Jung Hoon Lee, Daejeon (KR); Chul Haeng Lee, Daejeon (KR); Jeong Woo Oh, Daejeon (KR); Sol Ji Park, Daejeon (KR)

(73) Assignee: LG Energy Solution, Ltd.

( * ) Notice: Subject to any disclaimer, the term of this patent is extended or adjusted under 35 U.S.C. 154(b) by 770 days.

(21) Appl. No.: 15/759,019

(22) PCT Filed: Mar. 30, 2017

(86) PCT No.: PCT/KR2017/003505
§ 371 (c)(1),
(2) Date: Mar. 9, 2018

(87) PCT Pub. No.: WO2017/171442
PCT Pub. Date: Oct. 5, 2017

(65) Prior Publication Data
US 2020/0227781 A1 Jul. 16, 2020

(30) Foreign Application Priority Data
Mar. 30, 2016 (KR) .................. 10-2016-0038574

(51) Int. Cl.
*H01M 10/0565* (2010.01)
*H01M 10/0525* (2010.01)

(52) U.S. Cl.
CPC ... *H01M 10/0565* (2013.01); *H01M 10/0525* (2013.01); *H01M 2300/0082* (2013.01); *H01M 2300/0085* (2013.01)

(58) Field of Classification Search
CPC ........... H01M 10/0565; H01M 10/052; H01M 10/0552; H01M 10/0568; H01M 10/0569; H01M 2220/30; H01M 2300/0082; H01M 2300/0085
See application file for complete search history.

(56) References Cited

U.S. PATENT DOCUMENTS

| | | | |
|---|---|---|---|
| 2003/0082458 A1 | 5/2003 | Oyama | |
| 2008/0083626 A1* | 4/2008 | Kubo | C07C 255/05 205/688 |
| 2008/0138704 A1* | 6/2008 | Mizuta | H01G 11/06 429/203 |
| 2009/0104538 A1 | 4/2009 | Wakihara et al. | |
| 2010/0003604 A1 | 1/2010 | Kang et al. | |
| 2015/0079480 A1 | 3/2015 | Ahn et al. | |
| 2016/0028111 A1 | 1/2016 | Ahn et al. | |

FOREIGN PATENT DOCUMENTS

| | | |
|---|---|---|
| CN | 101218705 A | 7/2008 |
| CN | 103570873 A | 2/2014 |
| CN | 104380519 A | 2/2015 |
| JP | 5197000 B2 | 5/2013 |
| JP | 2017-114857 * | 6/2017 |
| KR | 20010006825 A | 1/2001 |
| KR | 20040099606 A | 12/2004 |
| KR | 100744835 B1 | 7/2007 |
| KR | 20140008264 A | 1/2014 |
| KR | 101502926 B1 | 3/2015 |
| KR | 20150050508 A | 5/2015 |
| KR | 20150088773 A | 8/2015 |
| WO | 2015046591 A1 | 4/2015 |

OTHER PUBLICATIONS

Cai et al ("The study of novel gel polymer electrolytes plasticized with non-volatile tris(methoxypolyethyleneglycol) aluminate esters". Electrochimica Acta, vol. 106, Sep. 2013, p. 209-2014).*
Masuda et al ("Study on ionic conductivity of polymer electrolyte plasticized with PEG-aluminate ester for rechargeable lithium ion battery". Solid State ionics, vol. 177, Issue 9-10. Mar. 2006, p. 843-846).*
Search report from International Applicaiton No. PCT/KR2017/003505, dated Jul. 25, 2017.
Database WPI, Week 201533, Thomson Scientific, London, GB; AN 2015-226279, XP002780465.
Extended European Search Report including Written Opinion for Application No. EP17775866.1 dated May 9, 2018.
Chinese Search Report for Application No. 201780003249.X, dated Apr. 1, 2020, pp. 1-3.

* cited by examiner

*Primary Examiner* — Stephen J Yanchuk
(74) *Attorney, Agent, or Firm* — Lerner, David, Littenberg, Krumholz & Mentlik, LLP

(57) ABSTRACT

The present invention relates to a composition for a gel polymer electrolyte, a gel polymer electrolyte prepared using the same and an electrochemical device including the same, and specifically provides a composition for a gel polymer electrolyte including an oligomer which includes a compound represented by Formula 1 and a compound represented by Formula 2, provides a gel polymer electrolyte prepared using the same, and provides an electrochemical device including the same.

12 Claims, No Drawings

COMPOSITION FOR GEL POLYMER ELECTROLYTE, GEL POLYMER ELECTROLYTE PREPARED THEREFROM, AND ELECTROCHEMICAL DEVICE INCLUDING THE SAME

CROSS-REFERENCE TO RELATED APPLICATIONS

The present application is a national phase entry under § 371 of International Application No. PCT/KR2017/003505 filed Mar. 30, 2017, which claims priority from Korean Patent Application No. 10-2016-0038574, filed on Mar. 30, 2016, the disclosures of which are incorporated herein by reference.

TECHNICAL FIELD

The present invention relates to a composition for a gel polymer electrolyte, a gel polymer electrolyte prepared by polymerizing the same, and an electrochemical device including the same.

BACKGROUND ART

Recently, the application of energy storage technology has expanded to cell phones, camcorders, notebook PCs, and electric vehicles, resulting in intensive research on and development of batteries.

In this regard, electrochemical devices are one of the subjects of great interest. Particularly, due to the recent trend of electronics becoming smaller and more lightweight, development of lithium secondary batteries having a smaller size and a lighter weight and capable of charging and discharging at a high capacity has been the focus of attention.

In general, when used in the secondary battery, the liquid electrolyte, the gel polymer electrolyte, and the solid polymer electrolyte improve the safety of the secondary battery in the respective order. On the other hand, the battery performance decreases in the respective order. Due to such an inferior battery performance, the secondary batteries that introduced the solid polymer electrolyte have not been commercialized.

Since the gel polymer electrolyte has better electrochemical stability than a solid polymer electrolyte, the thickness of the battery can be kept consistent, and since contact between an electrode and the electrolyte is excellent due to the inherent adhesiveness of the gel phase, a thin-film type battery can be prepared.

However, since a secondary battery including a gel polymer electrolyte still contains a non-aqueous organic solvent, the problems of thermal stability and leakage are not completely solved and battery performance characteristics such as lithium ion conductivity are inferior to that of a liquid electrolyte battery, and thus commercialization thereof is still limited.

PRIOR ART LITERATURE

Japanese Patent No. 5197000
Korean Patent No. 10-0744835

DISCLOSURE

Technical Problem

The present invention is designed to solve the aforementioned problems, and it is a first objective of the present invention to provide a gel polymer electrolyte composition.

Further, a second objective of the present invention is to provide a gel polymer electrolyte prepared by curing the composition in order to improve flame retardancy, thermal stability and resistance reduction.

Further, a third objective of the present invention is to provide an electrochemical device including the gel polymer electrolyte.

Technical Solution

In order to achieve the objectives, according to an embodiment of the present invention, there is provided a gel polymer electrolyte composition, including: a lithium salt, an organic solvent, a polymerization initiator, a compound represented by the following Formula 1, and a compound represented by the following Formula 2.

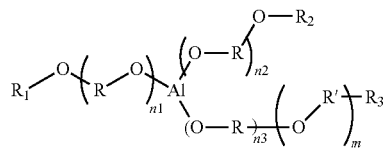

(Formula 1)

In Formula 1,

R and R' each independently represent a linear or non-linear alkylene group having 1 to 5 carbon atoms, $R_1$ and $R_2$ each independently represent a linear or non-linear alkyl group having 1 to 5 carbon atoms, —(O)CCH=$CH_2$ or —(O)C($CH_3$)C=$CH_2$, $R_3$ is an acrylate group (—O(O)CCH=$CH_2$) or a methacrylate group (—O(O)C($CH_3$)C=$CH_2$), n1, n2, and n3 each independently represent an integer of 0 to 9, and m is an integer of 0 to 3.

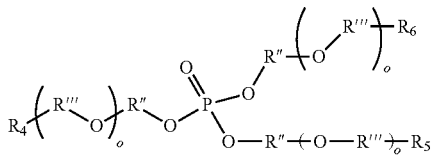

(Formula 2)

In Formula 2,

R" and R"' each independently represent a linear or non-linear alkylene group having 1 to 5 carbon atoms, $R_4$, $R_5$, and $R_6$ each independently represent an acrylate group (—O(O)CCH=$CH_2$) or a methacrylate group (—O(O)C($CH_3$)C=$CH_2$), and o is an integer of 0 to 9.

The compound represented by Formula 1 and the compound represented by Formula 2 may be included in an amount of 0.5 wt % to 20 wt %, and specifically 2.0 wt % to 10 wt % based on the total weight of the gel polymer electrolyte composition.

Here, the weight ratio of the compound represented by Formula 1 to the compound represented by Formula 2 may be in the range of 1:50, to 50:1, specifically 1:10 to 10:1, and more specifically 1:4 to 4:1.

Further, according to an embodiment of the present invention, there is provided a gel polymer electrolyte including a lithium salt, an organic solvent, and an oligomer prepared by polymerization of the compound represented by Formula 1 and the compound represented by Formula 2.

Further, according to an embodiment of the present invention, there is provided an electrochemical device including a positive electrode, a negative electrode, a separator interposed between the positive electrode and the negative electrode, and a gel polymer electrolyte prepared by curing the gel polymer electrolyte composition of the present invention.

The electrochemical device includes a lithium secondary battery.

Advantageous Effects

According to an embodiment of the present invention, when a gel polymer electrolyte including an oligomer prepared by a polymerization reaction between the compound represented by Formula 1 and the compound represented by Formula 2 is provided, an electrochemical device with improved capacity and various improvements in performance characteristics such as excellent electrochemical stability, flame retardancy, reactivity, mechanical strength, and lithium ion conductivity can be prepared.

BEST MODE OF THE INVENTION

Hereinafter, the present invention will be described in detail in order to facilitate understanding of the present invention. It should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

Specifically, in an embodiment of the present invention, there is provided a gel polymer electrolyte composition including a lithium salt, an organic solvent, a polymerization initiator, a compound represented by the following Formula 1, and a compound represented by the following Formula 2.

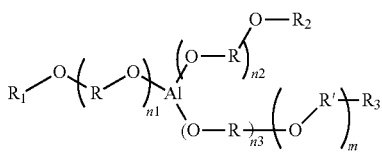

(Formula 1)

In Formula 1,

R and R' each independently represent a linear or non-linear alkylene group having 1 to 5 carbon atoms, $R_1$ and $R_2$ each independently represent a linear or non-linear alkyl group having 1 to 5 carbon atoms, —O)CCH=CH$_2$, or —O)C(CH$_3$)C=CH$_2$, $R_3$ is an acrylate group (—O(O)CCH=CH$_2$) or a methacrylate group (—O(O)C(CH$_3$)C=CH$_2$), n1, n2, and n3 each independently represent an integer of 0 to 9, and m is an integer of 0 to 3.

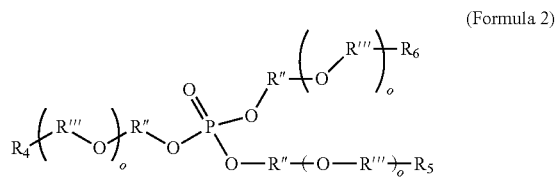

(Formula 2)

In Formula 2,

R" and R'" each independently represent a linear or non-linear alkylene group having 1 to 5 carbon atoms, $R_4$, $R_5$, and $R_6$ each independently represent an acrylate group (—O(O)CCH=CH$_2$) or a methacrylate group (—O(O)C(CH$_3$)C=CH$_2$), and o is an integer of 0 to 9.

Specific examples of the compound represented by Formula 1 include one or more compounds selected from the group consisting of compounds represented by the following Formulas 1a to 1c.

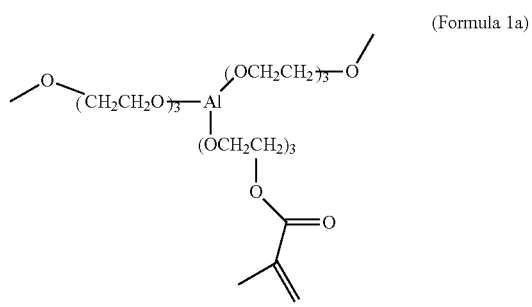

(Formula 1a)

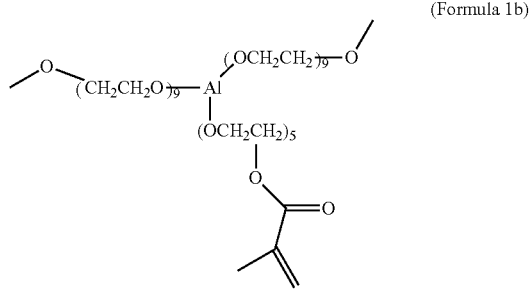

(Formula 1b)

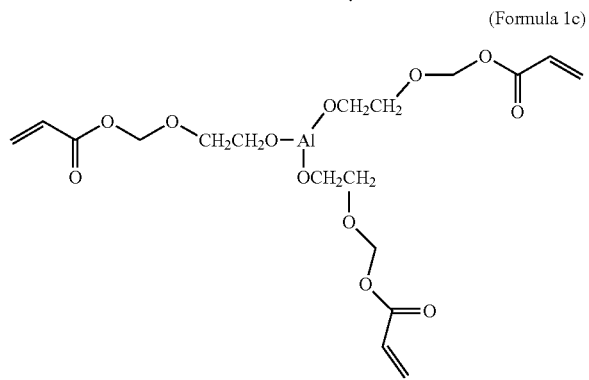

(Formula 1c)

Due to including an ester group, the compound represented by Formula 1 has excellent affinity with a carbonate and a linear saturated ester used as electrolyte solvents, and can prevent the exudation of the electrolyte solvent that may occur during charging and discharging.

Further, since the compound represented by Formula 1 contains many oxygen atoms having polarity, lithium ion conductivity of a polymer electrolyte can be improved.

Particularly, since the compound represented by Formula 1 contains one or more (meth)acrylate groups as a substituent, a polymerization reaction may be carried out in various forms. Accordingly, a polymer network of a planar structure or a three-dimensional network structure may be formed to improve the mechanical strength of the gel polymer electrolyte.

Further, specific examples of the compound represented by Formula 2 includes one or more compounds selected from the group consisting of compounds represented by the following Formulas 2a and 2b.

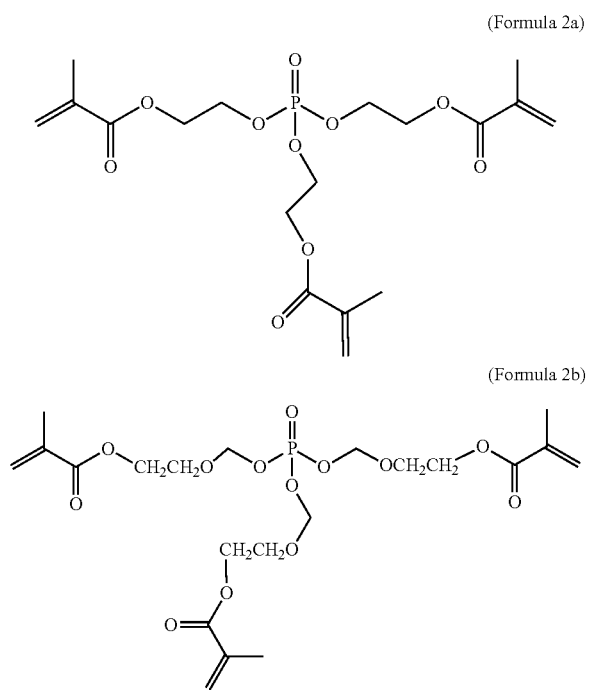

(Formula 2a)

(Formula 2b)

The compound represented by Formula 2 includes a phosphate group which is a flame-retardant functional group and at least two or more (meth)acrylate groups, and thus may form a polymer network of a three-dimensional network structure, which is the basic skeleton of the gel polymer electrolyte, through a polymerization reaction. Accordingly, the mechanical strength of the gel polymer electrolyte can be improved, and effects of improving electrochemical stability, thermal stability, and flame retardancy can be attained.

Further, since the compound represented by Formula 2 contains many oxygen atoms having polarity, the lithium ion conductivity of the polymer electrolyte can be improved.

Particularly, the compound represented by Formula 2 is converted to phosphoric acid by pyrolysis, and a dehydration reaction occurs from the converted phosphoric acids to form crosslinking. Accordingly, it is possible to inhibit the inflow of oxygen into the electrolyte and suppress the combustion of an organic solvent.

In the gel polymer electrolyte composition according to an embodiment of the present invention, the compound represented by Formula 1 and compound represented by Formula 2 may be included in an amount of 0.5 wt % to 20 wt %, specifically 2.0 wt % to 10 wt %, based on the total weight of the gel polymer electrolyte composition.

When the total content of the compound represented by Formula 1 and the compound represented by Formula 2 is less than 0.5 wt %, it is difficult to synthesize an oligomer in the gel polymer electrolyte and gelation is difficult, and thus the mechanical properties of the resulting gel polymer electrolyte may be deteriorated. When the total content of the compound represented by Formula 1 and the compound represented by Formula 2 is more than 20 wt %, the content of electrolyte solvent in the electrolyte decreases and the unpolymerized compound represented by Formula 1 and compound represented by Formula 2 remain in the electrolyte and increase resistance, such that the lithium ion conductivity of the battery may be lowered. Accordingly, the performance of the battery may be deteriorated.

Further, in the gel polymer electrolyte composition according to an embodiment of the present invention, the weight ratio of the compound represented by Formula 1 to the compound represented by Formula 2 present in the gel polymer electrolyte composition may be in the range of 1:50 to 50:1, specifically 1:10 to 10:1, and more specifically 1:4 to 4:1.

When the relative content ratio of the compounds represented by Formulas 1 and 2 is within the above-described range, a gel polymer electrolyte having excellent phase stability can be formed to produce a secondary battery having various improved properties such as low resistance, high ion conductivity, and a high lithium (Li) cation transference number. On the other hand, when the relative content ratio of the compound represented by Formula 1 or 2 is out of the above-described range, it is difficult to produce a gel polymer electrolyte having excellent physical properties due to a decrease in miscibility with a solvent and a secondary battery having low ion conductivity and Li cation transference number may be produced.

Further, in the gel polymer electrolyte composition of the present invention, the lithium salt may be any lithium salt conventionally used in an electrolyte for a lithium secondary battery. For example, the lithium salt may include $Li^+$ as a cation, and include one or more selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $BC_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(F_2SO_2)_2N^-$, $CF_3CF_2(CF_3)_2CO^-$, $(CF_3SO_2)_2CH^-$, $CF_3(CF_2)_7SO_3^-$, $CF_3CO_2^-$, $CH_3CO_2^-$, $SCN^-$, and $(CF_3CF_2SO_2)_2N^-$ as an anion. A single lithium salt or combination of two or more may be used as necessary. The content of the lithium salt used may be suitably changed to be within a usable range, but the lithium salt may be contained in the electrolyte composition at a concentration of 0.8 to 1.5 M in order to obtain an effect of forming an optimum anti-corrosive film on an electrode surface.

Further, in the gel polymer electrolyte composition of the present invention, the polymerization initiator is a component which is decomposed by heat to form a radical and induces crosslinking of a polymerizable monomer by free radical polymerization, and may be included in an amount of 0.01 to 5 parts by weight based on 100 parts by weight of total compounds including the compound represented by Formula 1 and the compound represented by Formula 2.

Non-limiting examples of the polymerization initiator include organic peroxides such as benzoyl peroxide, acetyl peroxide, dilauryl peroxide, di-tert-butylperoxide, t-butyl peroxy-2-ethyl-hexanoate, cumyl hydroperoxide, hydrogen peroxide or the like, or azo compounds such as 2,2'-azobis (2-cyanobutane), 2,2-azobis(methylbutyronitrile), 2,2'-azobis(isobutyronitrile)(AIBN), 2,2'-azobisdimethyl-valeronitrile (AMVN), or the like.

Further, in the gel polymer electrolyte composition of the present invention, the organic solvent is not particularly limited as long as it is a non-aqueous organic solvent used in the production of a typical electrolyte, and representative examples thereof include a cyclic carbonate, a linear carbonate, an ether, an ester, a sulfoxide, an acetonitrile, a lactone, a lactam, a ketone, etc.

Examples of the cyclic carbonate include ethylene carbonate (EC), propylene carbonate (PC), butylene carbonate (BC), fluoroethylene carbonate (FEC), etc.

Examples of the linear carbonate include diethyl carbonate (DEC), dimethyl carbonate (DMC), dipropyl carbonate (DPC), ethyl methyl carbonate (EMC), methyl propyl carbonate (MPC), etc.

Examples of the ether include dibutyl ether, tetrahydrofuran, 2-methyltetrahydrofuran, 1,4-dioxane, 1,2-dimethoxyethane, 1,2-diethoxyethane, etc. Examples of the ester include ethyl formate, ethyl formate, propyl formate, methyl acetate, ethyl acetate, propyl acetate, methyl propionate, ethyl propionate, butyl propionate, methyl pivalate, etc.

Further, an example of the sulfoxide includes dimethyl sulfoxide or the like.

An example of the lactone includes gamma butyrolactone (GBL), an example of the lactam includes N-methyl-2-pyrrolidone (NMP), and an example of the ketone includes polymethyl vinyl ketone. Further, halogen derivatives of the above-described organic solvents may also be used. The organic solvents may be used alone or in combination.

The gel polymer electrolyte composition according to an embodiment of the present invention may further include a first additive having two or more double bonds at the terminals thereof to enhance reactivity.

Representative examples of the first additive include tetraethylene glycol diacrylate, polyethylene glycol diacrylate (with a weight average molecular weight of 50 to 20,000), 1,4-butanediol diacrylate, 1,6-hexandiol diacrylate, trimethylolpropane triacrylate, trimethylolpropane ethoxylate triacrylate, trimethylolpropane propoxylate triacrylate, ditrimethylolpropane tetraacrylate, pentaerythritol tetraacrylate, pentaerythritol ethoxylate tetraacrylate, dipentaerythritol pentaacrylate, dipentaerythritol hexaacrylate, and the like, and these monomers may be used alone or in combination of two or more.

The first additive may be included in an amount within 10 parts by weight based on 100 parts by weight of the composition for a gel polymer electrolyte. When the content of the first additive exceeds 10 parts by weight, not only is a dense gel polymer formed, but also the ion conductivity of the battery is decreased due to the electrolyte solvent content of the electrolyte being too small, and the performance of the battery may be deteriorated.

The gel polymer electrolyte composition according to an embodiment of the present invention may further include a second additive in order to secure the effects of increasing flame retardancy, reducing resistance, and the like.

The second additive may be included in an amount within 10 parts by weight based on 100 parts by weight of the composition for a gel polymer electrolyte. When the content of the second additive exceeds 10 parts by weight, not only is a dense gel polymer formed, but also the ion conductivity of the battery is decreased due to the electrolyte solvent content of the electrolyte being too small, and the performance of the battery may be deteriorated.

Further, according to an embodiment of the present invention, a gel polymer electrolyte prepared by curing the gel polymer electrolyte composition may be provided.

Here, the gel polymer electrolyte may include an oligomer produced by a polymerization reaction between the compound represented by Formula 1 and the compound represented by Formula 2.

The oligomer may be included and impregnated with an electrolyte, which is an organic solvent containing a lithium salt.

Further, according to an embodiment of the present invention, there is provided an electrochemical device including a positive electrode, a negative electrode, a separator interposed between the positive electrode and the negative electrode, and a gel polymer electrolyte prepared by curing the gel polymer electrolyte composition of the present invention.

Here, the electrochemical device includes all devices in which an electrochemical reaction is performed, and examples thereof include primary batteries, secondary batteries, fuel cells, solar cells, capacitors, etc. Among these, the secondary battery may be a lithium secondary battery, and non-limiting examples of the lithium secondary battery may include a lithium metal secondary battery, a lithium ion secondary battery, a lithium polymer secondary battery, and a lithium ion polymer secondary battery.

Here, the gel polymer electrolyte of the present invention may be formed by curing the above-described composition for a gel polymer electrolyte according to conventional methods known in the related field. For example, the gel polymer electrolyte may be formed from curing by performing an in-situ polymerization reaction through thermal polymerization of the composition for a gel polymer electrolyte injected in the electrochemical device.

According to a more preferred embodiment, the electrochemical device may be manufactured by a method including (a) inserting an electrode assembly formed by wrapping a positive electrode, a negative electrode, and a separator disposed between the positive electrode and the negative electrode in a case of an electrochemical device; and (b) injecting the composition for a gel polymer electrolyte of the present invention into the case and curing by polymerization to form a gel polymer electrolyte.

The polymerization reaction may be performed through a heating, e-beam, or gamma ray process and room temperature or high temperature aging processes. In the case that the polymerization reaction is a thermal polymerization, about 20 minutes to 12 hours may be consumed, and the thermal polymerization may be performed at a temperature of 40 to 100° C.

The polymerization reaction of the present invention is preferably carried out under inert conditions. When the polymerization reaction is carried out under inert conditions, since the reaction of radicals with oxygen as radical-scavenger present in atmosphere is fundamentally blocked, it is possible to improve the extent of reaction of the polymerization to a level at which almost no unreacted monomers are present. Accordingly, degradation in charge and discharge performance caused by a large amount of unreacted monomers remaining inside the battery can be prevented.

As the inert condition, a gas having low reactivity known in the related field may be used, and particularly, at least one inert gas selected from the group consisting of nitrogen, argon, helium, and xenon may be used.

Further, the positive electrode and the negative electrode included in the lithium secondary battery may be produced using conventional methods known in the related field. For example, positive electrode active material slurry is prepared by mixing a positive electrolyte active material with a solvent, a binder, a conductive material, and a dispersant as necessary and stirring, and then is applied onto a metal current collector, pressed and dried to produce a positive electrode.

The positive electrode active material is a compound capable of reversibly intercalating and deintercalating lithium, and specifically may include a lithium composite metal oxide including lithium and one or more metals such as cobalt, manganese, nickel, or aluminum. More specifically, examples of the lithium composite metal oxide include lithium-manganese-based oxides such as $LiMnO_2$, $LiMn_2O_4$, and the like, lithium-cobalt-based oxides such as $LiCoO_2$, lithium-nickel-based oxides such as $LiNiO_2$, lithium-nickel-manganese-based oxides such as $LiNi_{1-Y}M_{nY}O_2$ (where 0<Y<1), $LiMn_{2-z}Ni_zO_4$ (where 0<Z<2) and the like, lithium-nickel-cobalt-based oxides such as $LiNi_{1-Y1}Co_{Y1}O_2$ (where 0<Y1<1), lithium-manganese-cobalt-based oxides such as $LiCo_{1-Y2}Mn_{Y2}O_2$ (where 0<Y2<1), $LiMn_{2-z1}Co_{z1}O_4$ (where 0<Z1<2) and the like, lithium-nickel-manganese-cobalt-based oxides such as $Li(Ni_pCo_qMn_{r1})O_2$ (where 0<p<1, 0<q<1, 0<r1<1, p+q+r1=1) or $Li(Ni_{p1}Co_{q1}Mn_{r2})O_4$ (where 0<p1<2, 0<q1<2, 0<r2<2, p1+q1+r2=2), oxides of lithium-nickel-cobalt-transition metal (M) such as $Li(Ni_{p2}Co_{q2}Mn_{r3}M_{s2})O_2$ (where M is selected from the group consisting of Al, Fe, V, Cr, Ti, Ta, Mg, and Mo, p2, q2, r3, and s2 each independently represent atomic fractions of elements, 0<p2<1, 0<q2<1, 0<r3<1, 0<s2<1, and p2+q2+r3+s2=1) and the like, and one or two or more thereof may be included. Among these, in terms of improving the capacity characteristics and stability of the battery, the lithium composite metal oxide may be $LiCoO_2$, $LiMnO_2$, $LiNiO_2$, lithium nickel manganese cobalt oxides such as $Li(Ni_{0.6}Mn_{0.2}Co_{0.2})O_2$, $Li(Ni_{0.5}Mn_{0.3}Co_{0.2})O_2$, $Li(Ni_{0.8}Mn_{0.1}Co_{0.1})O_2$, and the like, or lithium nickel cobalt aluminum oxides such as $Li(Ni_{0.8}Co_{0.15}Al_{0.05})O_2$ and the like. Considering the remarkable improvement resulting from controlling the type and content ratio of the constituent elements forming the lithium composite metal oxide, the lithium composite metal oxide may be $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, $L(iNi_{0.8}Mn_{0.1}Co_{0.1})O_2$, and the like, and one or a mixture of two or more thereof may be used.

The positive electrode active material may be included in an amount of 80 to 99 wt % based on the total weight of solids in the positive electrode slurry.

The conductive material is commonly added in an amount of 1 to 30 wt % based on the total weight of solids in the positive electrode slurry.

Any conductive material may be used without particular limitation so long as it has suitable conductivity without causing adverse chemical changes in the battery. Examples of suitable conductive materials include graphite; a carbon-based material such as carbon black, acetylene black, Ketjen black, channel black, furnace black, lamp black, and thermal black; conductive fibers such as carbon fibers and metallic fibers; metallic powders such as carbon fluoride powders, aluminum powders, and nickel powders; conductive whiskers such as zinc oxide and potassium titanate; conductive metal oxides such as titanium oxide; and polyphenylene derivatives. Specific examples of commercially available conductive materials may include various acetylene black-based products (Chevron Chemical Company, Denka black (Denka Singapore Private Limited, or Gulf Oil Company), Ketjen black, EC-based products (Armak Company), Vulcan XC-72 (Cabot Company), and Super P (Timcal Graphite & Carbon), and the like.

The binder is a component that assists in the binding between the active material and the conductive agent and in the binding with the current collector, and is generally included in an amount of 1 to 30 wt % based on the total weight of solids of the positive electrode slurry. Examples of the binder include polyvinylidene fluoride (PVDF), polyvinyl alcohol, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluororubbers, various copolymers, etc.

The solvent may include an organic solvent such as N-methyl-2-pyrrolidone (NMP), and may be used in an amount in which a preferable viscosity is obtained when the positive electrode active material, and optionally the binder and the conductive material, are included. For example, the solvent may be included such that the solid content in the solvent is in the range of 50 wt % to 95 wt % and preferably 70 wt % to 90 wt % in a slurry including the positive electrode active material and optionally the binder and the conductive material.

Further, the negative electrode may be prepared by forming a negative electrode mixture layer on a negative electrode current collector.

The negative electrode mixture layer may be formed by coating a slurry including a negative electrode active material, a binder, conductive material, a solvent, and the like, and then drying and pressing.

The negative electrode current collector is generally manufactured to have a thickness of 3 to 500 μm. Any negative electrode current collector may be used without particular limitation so long as high conductivity is provided without causing chemical changes in the battery. Examples of the negative electrode current collector include copper, stainless steel, aluminum, nickel, titanium, sintered carbon, or copper or stainless steel surface-treated with carbon, nickel, titanium, or silver, an aluminum-cadmium alloy and the like. The negative electrode current collector may include fine irregularities on the surface thereof so as to enhance adhesion to the negative electrode active material like the positive electrode current collector. In addition, the negative electrode current collector may be used in various forms such as a film, a sheet, a foil, a net, a porous structure, a foam, and a nonwoven fabric.

The negative electrode active material may be a conventional negative electrode active material that may be used for a negative electrode of a conventional electrochemical device, and non-limiting examples thereof are not particularly limited. Representative examples of the negative electrode active materials that may be used in the present invention may further include carbon such as non-graphitized carbon and graphitized carbon; $Li_xFe_2O_3$ (0≤x≤1), $Li_xWO_2$ (0≤x≤1), a lithium metal; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; and Li—Co—Ni based materials in addition to lithium titanium oxide (LTO).

In addition, a metal oxide such as $TiO_2$, $SnO_2$, and the like that may intercalate and deintercalate lithium and has a potential less than 2 V with respect to lithium may be used, but the present invention is not limited thereto. Particularly, a carbon material such as graphite, a carbon fiber, active carbon, and the like may be preferably used.

The negative electrode active material may be included in an amount of 80 wt % to 99 wt % based on the total weight of solids in the negative electrode slurry.

The binder is a component for assisting the bonding between the conductive material, the active material, and the current collector, and is generally included in an amount of 1 to 30 wt % based on the total weight of solids of the negative electrode slurry. Examples of the binder include polyvinylidene fluoride (PVDF), polyvinyl alcohol, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluororubbers, various copolymers, etc.

The conductive material is a component for further improving the conductivity of the negative electrode active material, and is commonly added in an amount of 1 to 20 wt % by weight based on the total weight of solids of the negative electrode slurry. Any conductive material may be used without particular limitation as long as suitable conductivity is provided without causing chemical changes in the battery. Examples of the conductive material include graphite such as natural or artificial graphite, carbon blacks such as acetylene black, Ketjen black, channel black, furnace black, lamp black, and thermal black, conductive fibers such as carbon fibers and metallic fibers, metallic powders such as carbon fluoride, aluminum, and nickel powders, conductive whiskers such as zinc oxide and potassium titanate, conductive metal oxides such as titanium oxide, and polyphenylene derivatives.

The solvent may include water or an organic solvent such as N-methyl-2-pyrrolidone (NMP), an alcohol and the like, and may be used in an amount in which a preferable viscosity is obtained when the negative electrode active material and optionally the binder and the conductive material are included. For example, the solvent may be included such that the solid content of the solvent is in the range of 50 wt % to 95 wt % and preferably 70 wt % to 90 wt % in a slurry including the negative electrode active material and optionally the binder and the conductive material.

The current collector is a metal having high conductivity and a metal to which the slurry of the electrode active material may easily attach. Any metals may be used as long as the metal has no reactivity in a voltage range of a battery. Specifically, examples of a positive electrode collector include aluminum, nickel, or a foil formed by the combination thereof, and non-limiting examples of a negative electrode collector may include copper, gold, nickel, a copper alloy, or a foil formed by the combination thereof.

Further, the separator is not particularly limited in form, but a porous separator may preferably be used. Non-limiting examples thereof include polypropylene, polyethylene, or polyolefin-based porous separator. In addition, methods for applying the separator in a battery may include a common winding method, a lamination (stacking) method, and a folding method of a separator and an electrode, etc.

The appearance of the electrochemical device of the present invention is not limited, and may be a cylindrical type using a can, a prismatic type, a pouch type, or a coin type, etc.

MODES OF THE INVENTION

Hereinafter, the present invention will be described in more detail referring to embodiments and comparative embodiments. However, the following embodiments are for illustrating the present invention, and the scope of the present invention is not limited to the embodiments set forth herein.

EXAMPLE

Example 1

(Preparation of Gel Polymer Electrolyte Composition)

In an organic solvent having a weight ratio of ethylene carbonate (EC): propylene carbonate (PC): ethyl methyl carbonate (EMC) equal to 1:1:1, $LiPF_6$ was dissolved in the air such that the concentration thereof was 1 M, and thereby a non-aqueous solvent was prepared. Thereafter, 95.489 g of the non-aqueous solvent, 0.5 g of the compound of Formula 1a, 4 g of the compound of Formula 2a, and 0.011 g of AIBN as a polymerization initiator were added to prepare a gel polymer electrolyte composition.

(Preparation of Positive Electrode)

$LiCoO_2$ as a positive electrode active material, carbon black as a conductive material, and PVDF as a binder were mixed at a weight ratio of 94:3:3, and then N-methyl-2-pyrrolidone (NMP) as a solvent was added thereto to prepare a positive electrode mixture slurry (solid content: 87 wt %). The positive electrode mixture slurry was applied to an aluminum (Al) thin film as a positive electrode current collector having a thickness of about 20 µm and dried to produce a positive electrode, which was followed by roll pressing.

(Preparation of Negative Electrode)

A carbon powder as a negative electrode active material, PVDF as a binder and carbon black as a conductive material were mixed at a weight ratio of 96:3:1 respectively, and then a mixture was added to NMP as a solvent to prepare a negative electrode mixture slurry (solid content: 89 wt %). The negative electrode mixture slurry was applied to a copper (Cu) thin film as a negative electrode current collector having a thickness of about 10 µm and dried to produce a negative electrode, which was followed by roll pressing.

(Preparation of Battery)

A battery was assembled using the positive electrode, the negative electrode, and a separator including three layers of polypropylene/polyethylene/polypropylene (PP/PE/PP), the prepared gel polymer electrolyte composition was injected into the battery assembled, which was followed by thermal polymerization at 80° C. for 4 hours under a nitrogen atmosphere to finally prepare a lithium secondary battery including a gel polymer electrolyte.

Example 2

A gel polymer electrolyte composition and a gel polymer lithium secondary battery including the gel polymer electrolyte composition were prepared in the same manner as in Example 1 except that a compound of Formula 2b was included instead of the compound of Formula 2a.

Example 3

A gel polymer electrolyte composition and a gel polymer lithium secondary battery including the gel polymer electrolyte composition were prepared in the same manner as in Example 1 except that 0.5 g of the compound of Formula 1b and 4 g of the compound of Formula 2a were included.

Example 4

A gel polymer electrolyte composition and a gel polymer lithium secondary battery including the gel polymer electrolyte composition were prepared in the same manner as in Example 3 except that a compound of Formula 2b was included instead of the compound of Formula 2a.

Comparative Example 1

A gel polymer electrolyte composition and a gel polymer lithium secondary battery including the gel polymer electrolyte composition were prepared in the same manner as in Example 1 except that the compound of Formula 1a was not included.

Comparative Example 2

A gel polymer electrolyte composition was prepared in the same manner as in Example 1 except that 69.4 g of the non-aqueous solvent and 0.5 g of the compound of Formula 1a, 30 g of the compound of Formula 2a, and 0.1 g of AIBN as a polymerization initiator were included.

TABLE 1

| | Compound of Formula 1 (g) | | Compound of Formula 2 (g) | |
|---|---|---|---|---|
| | Formula 1a | Formula 1b | Formula 2a | Formula 2b |
| Example 1 | 0.5 | — | 4 | — |
| Example 2 | 0.5 | — | — | 4 |
| Example 3 | — | 0.5 | 4 | — |
| Example 4 | — | 0.5 | — | 4 |
| Comparative Example 1 | — | — | 4 | — |
| Comparative Example 2 | 0.5 | — | 30 | — |

Experimental Example

Experimental Example 1. Evaluation of Ion Conductivity of Polymer Electrolyte

For each of the gel polymer electrolytes prepared in Examples 1 to 4 and Comparative Examples 1 and 2, a voltage bias of 10 mV was applied in the frequency range of 1 Hz to 1 MHz and resistance was measured while scanning temperature, and thereby ion conductivity at room temperature was measured. The results of ion conductivity measured by the AC impedance method are shown in the following Table 2.

The ion conductivity was measured using a Solartron 1260 impedance/gain-phase analyzer, and an impedance spectrum was recorded from 10 MHz to 10 Hz. The ion conductivity was calculated by the following Expression 1.

$$\text{Ion conductivity (S/cm)}; \delta = \frac{1}{R} \times \frac{L}{A} \qquad \text{[Expression 1]}$$

In Expression 1, R is a measurement resistance (ohm), L is a length (cm) between the measurement electrodes, and A is a cross-sectional area (cm$^2$) of the electrolyte membrane prepared.

Experimental Example 2. Measurement of Lithium Cation Transference Number

For each solid polymer electrolyte prepared in Examples 1 to 4 and Comparative Examples 1 and 2, a lithium cation transport rate ($t_{Li}^+$) was measured at 25° C. after temperature was stabilized for 30 minutes in a chamber at 25° C. using a VMP3 Multichannel potentiostat manufactured by Biologic Science Instruments, and the results are shown in the following Table 2.

The lithium cation transference number can be calculated by the following Expression 2. The values required for calculating of the lithium cation transference number are obtained by measuring a current decay value that decreases with time with respect to the impedance and the applied voltage after the initial impedance and current decay of a lithium symmetric cell or an SUS symmetric cell reached constant state (Electrochimica Acta 93 (2013) 254).

Impedance was measured according to the conditions of Experimental Example 1. A decrease in current was measured by monitoring for current dropping under a voltage of 10 mV, and it was confirmed that the current value was constantly maintained after 10 hours. Accordingly, constant impedance was an impedance of a cell measured after the voltage of 10 mV was applied for 10 hours.

$$t_{Li^+} = \frac{i_{ss}(\Delta V - i_0 R^0)}{i_0(\Delta V - i_{ss} R^{ss})} \qquad \text{[Expression 2]}$$

In Expression 2, ΔV is a change in the applied voltage, e.g. 10 mV, $i_o$ is an initial current, $i_{ss}$ is a current in a steady state, $R^0$ is an initial resistance, and $R^{ss}$ is a resistance in a rectified state.

Experimental Example 3. Cell Resistance Measurement

For each of lithium secondary batteries manufactured in Example 1 to 4 and Comparative Examples 1 and 2, resistance was measured at 25° C. by a 2-probe method using an impedance analyzer (Solartron 1260A Impedance/Gain-Phase Analyzer).

An amplitude was ±10 mV, and a frequency range was 0.1 to 1 MHz. A change in current density and impedance were measured when the elapsed time after the manufacture of the above-described lithium secondary batteries was 24 hours, and the results of measuring resistance values of secondary batteries are shown in the following Table 2.

TABLE 2

| | Ionic conductivity (S/cm) | Lithium cation transference number ($t_{Li}^+$) | Resistance (mohm, Ω) |
|---|---|---|---|
| Example 1 | 8.0 × 10$^{-3}$ | 0.45 | 8.05 |
| Example 2 | 7.9 × 10$^{-3}$ | 0.44 | 8.02 |
| Example 3 | 7.7 × 10$^{-3}$ | 0.43 | 8.20 |
| Example 4 | 7.4 × 10$^{-3}$ | 0.44 | 8.10 |
| Comparative Example 1 | 7.1 × 10$^{-3}$ | 0.34 | 9.10 |
| Comparative Example 2 | 1.5 × 10$^{-3}$ | 0.33 | 20.5 |

Referring to Table 2, it can be confirmed that, as compared with secondary batteries prepared in Comparative Examples 1 and 2, lithium secondary batteries prepared in Examples 1 to 4 had improved ion conductivity and lithium cation transference numbers at room temperature, while safety was sufficiently ensured by reducing an interfacial resistance.

Further, in the case of the secondary battery of Comparative Example 2, it can be predicted that resistance increased and ion conductivity decreased since unreacted components remained due to excessive use of an acrylate-based monomer.

The invention claimed is:

1. A gel polymer electrolyte composition, comprising:
   a lithium salt,
   an organic solvent,
   a polymerization initiator,
   a compound represented by the following Formula 1, and
   a compound represented by the following Formula 2:

(Formula 1)

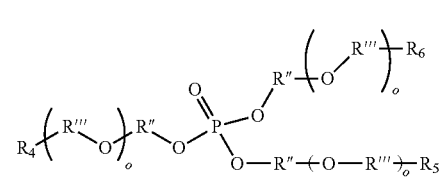

in Formula 1,

R and R' each independently represent a linear or non-linear alkylene group having 1 to 5 carbon atoms, $R_1$ and $R_2$ each independently represent a linear or non-linear alkyl group having 1 to 5 carbon atoms, —(O)CCH=CH$_2$, or —(O)C(CH$_3$)C=CH$_2$, $R_3$ is an acrylate group (—O(O)CCH=CH$_2$) or a methacrylate group (—O(O)C(CH$_3$)C=CH$_2$), n1, n2, and n3 each independently represent an integer of 0 to 9, and m is an integer of 0 to 3, (Formula 2)

in Formula 2,

R" and R''' each independently represent a linear or non-linear alkylene group having 1 to 5 carbon atoms, $R_4$, $R_5$, and $R_6$ each independently represent an acrylate group (—O(O)CCH=CH$_2$) or a methacrylate group (—O(O)C(CH$_3$)C=CH$_2$), and o is an integer of 0 to 9, wherein the compound represented by Formula 1 and the compound represented by Formula 2 are included in an amount of 0.5 wt % to 20 wt % based on the total weight of the gel polymer electrolyte composition, and wherein a weight ratio of the compound represented by Formula 1 to the compound represented by Formula 2 is in a range of 1:4 to 1:50.

2. The gel polymer electrolyte composition according to claim 1, wherein the compound represented by Formula 1 is one or more selected from the group consisting of compounds represented by the following Formulas 1a to 1c:

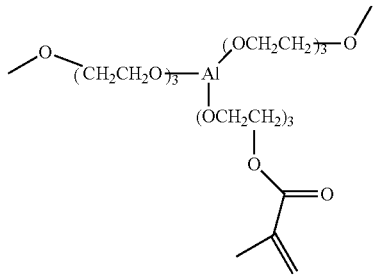

(Formula 1a)

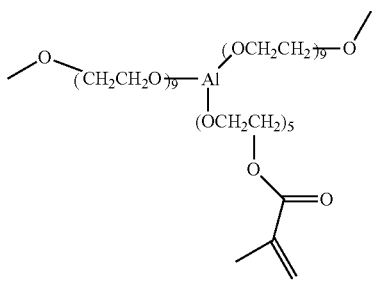

(Formula 1b)

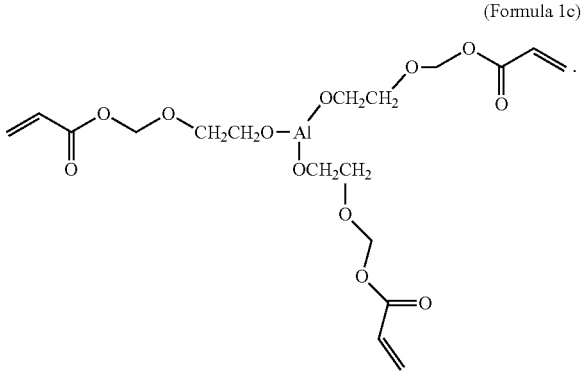

(Formula 1c)

3. The gel polymer electrolyte composition according to claim 1, wherein the compound represented by Formula 2 is a compound represented by the following Formula 2a or 2b:

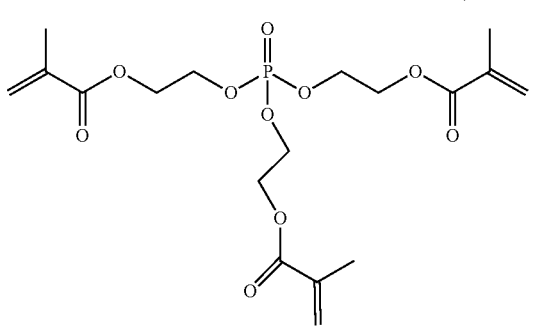

(Formula 2a)

(Formula 2b)

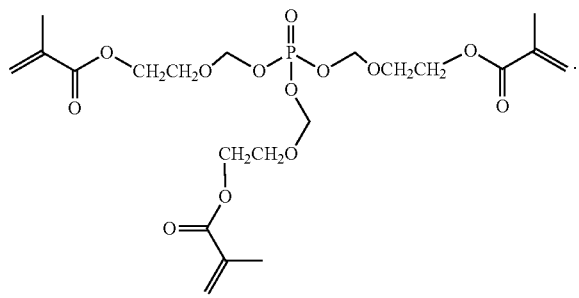

4. The gel polymer electrolyte composition according to claim 1, wherein the compound represented by Formula 1 and the compound represented by Formula 2 are included in an amount of 2.0 wt % to 10 wt % based on the total weight of the gel polymer electrolyte composition.

5. The gel polymer electrolyte composition according to claim 1, wherein a weight ratio of the compound represented by Formula 1 to the compound represented by Formula 2 is in a range of 1:4 to 1:8.

6. The gel polymer electrolyte composition according to claim 1, wherein the lithium salt includes $Li^+$ as a cation, and includes one or more selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $BC_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(F_2SO_2)_2N^-$, $CF_3CF_2(CF_3)_2CO^-$, $(CF_3SO_2)_2CH^-$, $CF_3(CF_2)_7SO_3^-$, $CF_3CO_2^-$, $CH_3CO_2^-$, $SCN^-$, and $(CF_3CF_2SO_2)_2N^-$ as an anion.

7. The gel polymer electrolyte composition according to claim 1, wherein the polymerization initiator is included in an amount of 0.01 to 5 parts by weight based on 100 parts by weight of the total compounds including the compound represented by Formula 1 and the compound represented by Formula 2.

8. The gel polymer electrolyte composition according to claim 1, wherein the organic solvent is a non-aqueous organic solvent selected from the group consisting of a cyclic carbonate, a linear carbonate, a lactone, an ether, an ester, a sulfoxide, an acetonitrile, a lactam, and a ketone.

9. A gel polymer electrolyte, prepared by curing the gel polymer electrolyte composition according to claim 1.

10. The gel polymer electrolyte according to claim 9, comprising an oligomer prepared by a polymerization reaction between the compound represented by Formula 1 and the compound represented by Formula 2.

11. An electrochemical device, comprising:
a positive electrode;
a negative electrode;
a separator interposed between the positive electrode and the negative electrode; and
the gel polymer electrolyte according to claim 9.

12. The electrochemical device according to claim 11, wherein the electrochemical device is a lithium secondary battery.

* * * * *